United States Patent Office
3,392,181
Patented July 9, 1968

3,392,181
CYCLIC BN-COMPOUNDS
Elmar-Manfred Horn, Aachen, Germany, assignor to Farbenfabriken Bayer Aktiengesellschaft, Leverkusen, Germany, a German corporation
No Drawing. Filed Feb. 11, 1964, Ser. No. 343,937
Claims priority, application Germany, Feb. 28, 1963, F 39,136
7 Claims. (Cl. 260—448.2)

ABSTRACT OF THE DISCLOSURE

Cyclic BN-compounds produced by reacting tertiary amine borine or pyridine borine with amino or hydroxy or mercapto substituted aryl- or aliphatic-amines, or with halo, alkyl, cycloalkyl, aryl, alkylsilyl, phenylsilyl, alkylsiloxyl or phenylsoloxyl derivatives thereof, at a temperature above 20° C., e.g. 100–200° C. in a molar ratio of about 1:1. The cyclic boron-nitrogen compounds exhibit neutron absorbing properties, can be applied as additives for propellant fuels and lubricants and can also be employed as plant protection agents.

It is an object of the present invention to produce cyclic BN-compounds. It is another object of the present invention to produce cyclic BN-compounds of the general formula

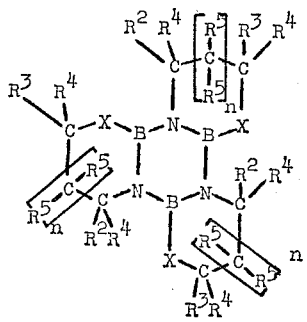

in which X stands for O, S or N; $R^2$, $R^3$ and $R^4$ stand for hydrogen or same or different halogen, alkyl, cycloalkyl, aryl, alkoxy, aroxy, nitro or diorgano amino radicals; and $n$ may be zero or one, whereby, if $n$ is zero, $R^2$ and $R^3$ may be closed to form a phenyl or naphthyl radical; $R^5$ has the same meaning as $R^2$, $R^3$ and $R^4$ or it may be alkyl- or phenyl-substituted silyl radicals or both $R^5$ may be dialkyl-silyl-methyl radicals which are closed to form a disiloxane via an oxygen atom.

In our copending applications Ser. Nos. 189,705 now U.S. Patent No. 3,297,749, and 309,401, now abandoned, there is described a process for the production of borazoles organically substituted at the nitrogen atom, characterized in that borazanes of the general formula $$R_3N \rightarrow BH_3$$

wherein R denotes hydrogen, alkyl, cycloalkyl or aryl radicals, are reacted with primary amines of the general formula $$R^1NH_2$$

wherein $R^1$ can be an alkyl, cycloalkyl or aryl radical, preferably in molar proportions of 1:1, at temperatures between the decomposition points of the employed borazanes and those of the borazoles to be prepared.

The object of the present invention is a process according to the aforementioned copending applications which is characterized in that borazanes of the general formula $$R_3N \rightarrow BH_3$$

wherein R denotes hydrogen, alkyl, cycloalky or aryl radicals or $R_3N$ represents pyridine, are reacted at temperatures above 20° C. with compounds of the general formula

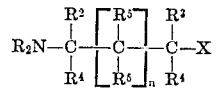

wherein X denotes OH, SH or $NHR^6$ groups; $R^2$, $R^3$ and $R^4$ are hydrogen or the same or different halogen, alkyl, cycloalkyl, aryl, alkoxy, aryloxy, nitro or diorganoamino radicals; $n$ is either zero or 1 and where, in the event of $n$ being zero, $R^2$ and $R^3$ may be closed to form a phenyl or naphthyl radical, optionally substituted by one or more of the same or different above specified radicals; $R^5$ may have the same meaning as $R^2$, $R^3$ and $R^4$ or it may be alkyl- or phenyl-substituted silyl radicals or both $R^5$ may be dialkyl-silyl-methyl radicals which are closed to form a disiloxane via an oxygen atom; and $R^6$ may be hydrogen or an alkyl, cycloalkyl or aryl radical, preferably in molar proportions of 1:1.

The process according to the invention may be described by the following examples:

In agreement with more recent proposals for nomenclature, the borazoles to be prepared are described below by the term "borazines."

(a) Preparation of tris(4,5-benzo-1,3,2-oxazaborolo)-borazine from N-triethyl-borazane and 2-aminophenol in accordance with 1:

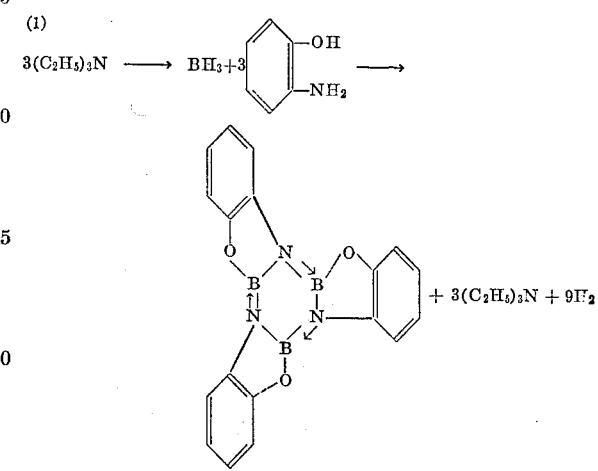

(b) Preparation of tris-(1,3,2-oxazaborolidino)-borazine from N-cyclohexyl-N,N-dimethyl-borazane and 2-aminoethanol in accordance with 2:

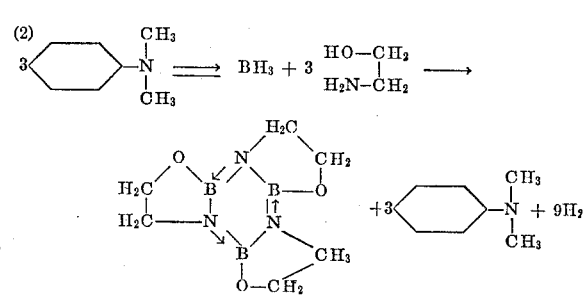

(c) Preparation of tris-(4,5-benzo-1,3,2-thiazaborolo)-borazine from pyridine-borine and 2-aminothiophenol in accordance with 3:

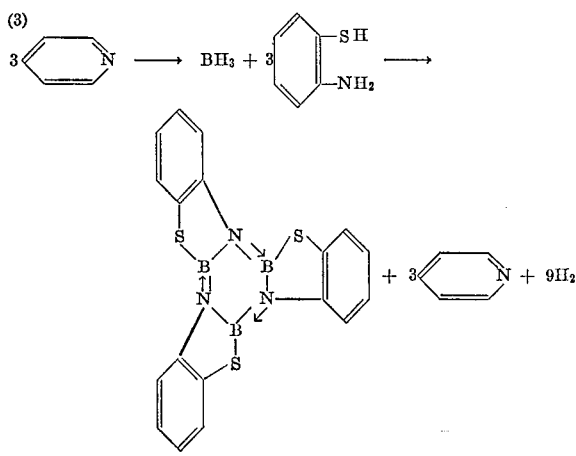

(d) Preparation of tris-(1 - methyl - 1,3,2 - diazaborinano)-borazine from N-triethyl-borazane and 1-amino-3-methylamino-propane in accordance with 4:

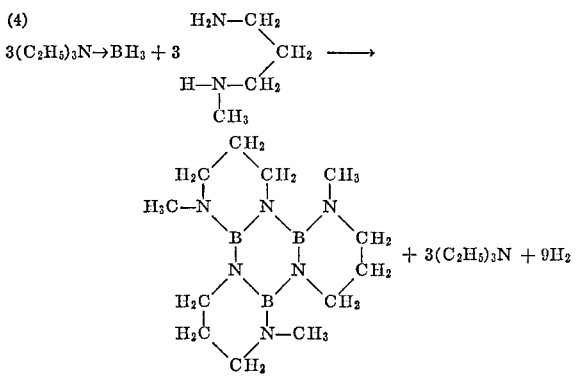

Processes for the production of the cyclic-substituted borazines which are for instance specified in the Equations 1 to 4 are known per se. Thus, a method for the preparation of tris-(4,5-benzo - 1,3,2 - oxazaborolo)-borazines and of tris-(4,5-benzo-1,3,2-thiazaborolo)-borazines optionally substituted at the benzene ring has been described in Abstracts of Papers, 61 P, 138th Meeting, American Chemical Society as well as in Journal Organic Chemistry 27 (1962), No. 11, pp. 3848–3851, and in U.S. patent specification 3,016,402. However, this process of preparation, which depends on the reaction between o-aminophenols optionally substituted at the nucleus or o-aminothiophenols optionally substituted at the nucleus and boron trichloride or boron tribromide, not only requires long reaction times but is also limited, particularly during its technical execution, by the strongly corrosive properties of the hydrogen halides formed as the side products and of the boron halides employed as the starting materials, the latter being in their turn very susceptible to hydrolysis. In addition, the economic potential of the process is limited by the expensive cooling measures required particularly when boron trichloride is employed.

A modification of this boron trihalide reaction (cf. Journal Organic Chemistry 26 (1961), No. 11, pp. 4632–4634; U.S. patent specifications 2,948,751 and 3,045,038; British patent specifications 870,959 and 876,690; German patent specifications 1,134,385 and 1,140,579) consists in the reaction between orthoboric acid esters with o-aminophenols, optionally substituted at the nucleus, or with o-aminoalcohols. However, considerable difficulties are again experienced during the technical execution of this process; caused by the readiness of orthoboric acid esters to become hydrolysed and by the slow rate of reaction. Thus, a period of 16.5 hours is required for the reaction of 109 g. of o-aminophenol with 188 g. of triisopropyl borate at temperatures of 150° C. (German patent specification 1,140,579, column 2, line 43).

It has now been found that o-aminophenols, o-aminothiophenols or o-phenylene diamines, optionally substituted at the nucleus, or amino-alcohols, aminothiols or aliphatic diamines of the general formula

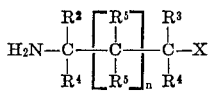

can be reacted smoothly and at high yields with borazanes to form cyclic-substituted borazines. No reaction partners with a corrosive activity are experienced during the process according to the invention. Apart from hydrogen, only the amine component of the employed borazane is formed as the side product. This amine is conveniently worked up by methods known per se, for instance by its reaction with boranates and boron halides, to form the borazanes serving as the starting products.

The borazanes serving as the starting products for the present process have the general formula

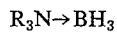

where R denotes hydrogen, alkyl, cycloalkyl or aryl groups or $R_3N$ represents pyridine. Owing to their ready availability, N-triorgano-borazanes or pyridine-borine are employed in particular. The following may be mentioned as examples of the borazanes which may be employed:

N - trimethyl-borazane, N - triethyl-borazane, N-tripropyl-borazane, N-tributyl-borazane, N,N-diethyl-N-butyl-borazane, N-cyclohexyl - N,N - dimethyl-borazane, N-(4-methylcyclohexyl) - N,N - dimethyl - borazane, N-phenyl-N,N - dimethyl-borazane, N - (4 - chlorophenyl)-N,N-dimethyl-borazane and pyridine-borine; however, it is also possible to employ other borazanes such as, for instance, N,N-diethyl-borazane or N-lauryl-borazane.

The following may be mentioned as examples of the o-aminophenols, o-aminonaphthols, o-aminothiophenols, o-aminothionaphthols, o-phenylene diamines, o-naphthylene diamines, aminoalcohols, aminothiols or aliphatic diamines to be employed for the process according to the invention:

2 - aminoethanol - (1), 3-aminopropanol-(1), 3-aminobutanol - (1), 2-aminobutanol-(1), 3-aminopentanol-(2), 1 - amino - 2 - methyl - butanol-(2), 4-amino-2-methylpentanol - (5), 4 - amino - 2,4-dimethyl-pentanol-(2), 5-amino - 2,5 - dimethyl-hexanol-(3), 4-amino-2-methyl-5-ethyl - heptanol - (5), 3-chloro-1-amino-propanol-(2), 3-amino - 1-diethylamino-propanol-(2), 3-amino-1-hydroxy-2 - methoxy - propane, 1-phenyl-2-amino-ethanol-(1); 2-aminophenol, 4 - chloro - 2-aminophenol, 3,4-dichloro-2-aminophenol, 3,4,6 - trichloro - 2 - aminophenol, 3,5-dibromo - 2-aminophenol, 4-nitro-2-aminophenol, 6-bromo-4 - nitro - 2 - aminophenol, 4,5-dimethyl-2-aminophenol, 3,4,5,6 - tetrachloro - aminophenol, 2-aminonaphthol-(3); 1,2 - diaminoethane, 1,3 - diaminopropane, 1,2-diaminobutane, 1,3 - diaminobutane, 2,4-diaminopentane, 2,3-diaminooctane, 1,3 - diamino - 2,2 - dimethylpropane, 1,2-diamino - 2-methyl-propane, 1,3-diamino-2-methyl-butane, 2,3 - diamino - 2 - methyl - butane, 3,4 - diamino-3,4-dimethyl - hexane, 2 - bromo - 1,3-diamino-propane, 1,2-diamino - 4 - dimethylamino-butane, 1,3-diamino-2-phenylpropane, 1 - amino - 2 - methylamino-ethane, 3-amino-1-ethylamino - propane, 3-amino-1-propylamino-propane, 3-amino - 1 - octylamino-propane, 2-amino-1-ethylamino-2-methyl - propane, 1 - amino-3-cyclohexylamino-propane, o - phenylene diamine, 4 - chloro - 1,2-diamino-benzene, 4-chloro - 6 - methyl - 1,2 - diamino-benzene, N-methyl-o-phenylene diamine, 5-bromo-2-ethyl-amino-aniline, naphthylene diamine - (2,3); 2 - amino - ethane-thiol-(1), 2- amino-propane-thiol-(2), 2-amino-butane-thiol-(3), 2-amino-thiolphenol, 3-chloro-2-amino-thiolphenol, 3-chloro-5-methyl-2-amino-thiophenol, 2-amino-thiophenol-(1) and 1-amino-thiophenol-(2); as well as in two-position alkyl-silyl- or phenyl-silyl-substituted 3-amino-propanols-(1) and 1,3-propylene diamine, as e.g. 4-amino-methyl-4-hydroxy-methyl-1-oxa-2,2,6,6-tetramethyl-2,6-disila-cyclohexane, 2-ethyldimethyl-silyl-methyl-3-amino-propanol-(1), 2-trimethyl-silyl-methyl-propylene diamine-(1,3) or 2-phenyl-dimethyl-silyl-methyl-propylene diamine-(1,3).

For carrying out the process according to the invention it is convenient but not essential to employ solvents or suspension agents like aromatic hydrocarbons or saturated aliphatic hydrocarbons, for instance, which are inert towards the reaction partners.

The reaction is carried out at temperatures above 20° C., preferably at temperatures above 100° C., and more preferably at temperatures between 100 and 200° C. The low reaction temperatures enable the reaction to be carried out without increasing the pressure; however, it is also possible to operate under increased pressures, for instance, under a pressure of nitrogen.

The cyclic boron-nitrogen compounds to be obtained in accordance with the process, which are unexpectedly stable, may be applied as intermediate products, for instance, during the production of polymers containing boron which exhibit neutron absorbing properties. In addition, the specified compounds can be applied as additives for propellant fuels and lubricants; they can also be employed as plant protection agents.

The following examples are given for the purpose of illustrating the invention.

Example 1

Preparation of tris-(1',3',4'-trichloro-benzo-[5,6-d]-1,3,2-oxazaborolo)-borazine.

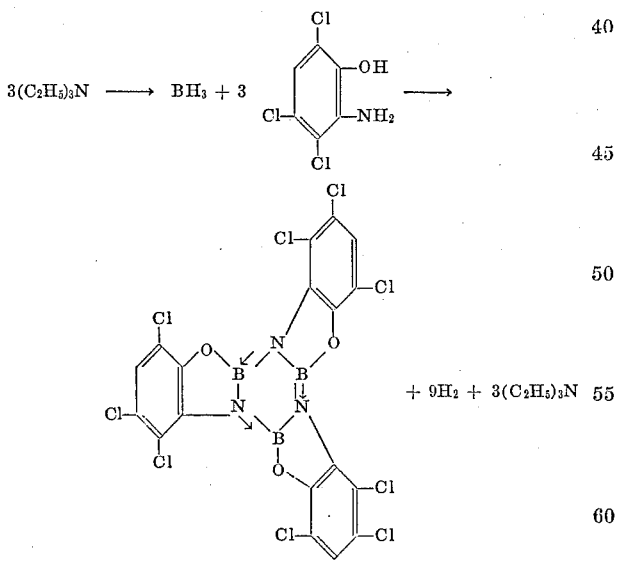

A solution of 104 g. of N-triethyl-borazane (0.9 mol) in 200 ml. of 1,2,4-trimethylbenzene is heated to about 130 to 135° C. under an atmosphere of protecting gas in a round bottomed flask fitted with a stirrer, reflux condenser, drop funnel, immersed thermometer and descending condenser, and 182 g. (0.86 mol) of 3,4,6-trichloro-2-amino-phenol, as a suspension in 250 ml. of 1,2,4-trimethylbenzene, are then added dropwise during about 1 hour, whilst stirring. During this period, the major part of the liberated triethylamine is distilled off. In order to complete the reaction, the reaction mixture is subsequently heated at about 150–155° C. for about 1.5 hours, it is cooled, filtered, and the residue from filtration is washed with a little benzene and then dried. Small amounts of unreacted 3,4,6-trichloro-2-amino-phenol can be separated from the crude product (of M.P. 401–404° C.) thus obtained by means of sublimation in vacuum. The tris-(1',3',4'-trichloro-benzo-[5,6-d]-1,3,2-oxazaborolo)-borazine purified by subliming off the impurities and identified from its infra-red spectrum has a melting point of 410–416° C. Yield 85.1% of the theoretical.

*Analysis.*—Theoretical: C, 32.7%; N, 6.35%; Cl, 48.3%; B, 4.9%. Found: C, 32.50%, 32.67%; N, 6.20%, 6.47%; Cl, 47.83%, 47.97%; B, 5.1%.

Example 2

Preparation of tris-(1,3,2-oxazaborolidino)-borazine.

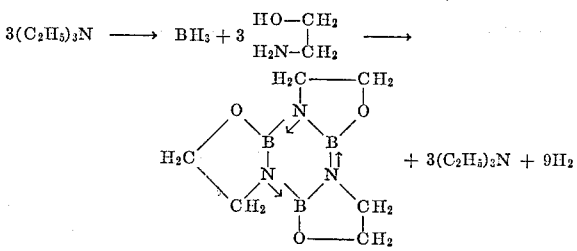

183 g. (3 mols) of 2-amino-ethanol are added dropwise during about 2 hours, whilst stirring, to a mixture of 650 ml. of o-xylene and 380 g. (3.3 mols) of N-triethyl-borazane under an atmosphere of protecting gas in the apparatus described in Example 1, at a sump temperature of about 125–130° C., and the contents of the flask are then heated at about 135–140° C. for about ½ hour in order to complete the reaction. The o-xylene employed as the solvent is subsequently distilled off under reduced pressure, and the tris-(1,3,2-oxazaborolidino)-borazine, identified from its infra-red spectrum, is then purified by sublimation in vacuum. Yeld: 92,7%.

*Analysis.*—Theoretical: B, 15.65%. Found: B, 15.57%.

The mass spectrometrical molecular weight yields a value of 207 mass units.

Example 3

Preparation of tris-(1,3,2-oxazaborinano)-borazine.

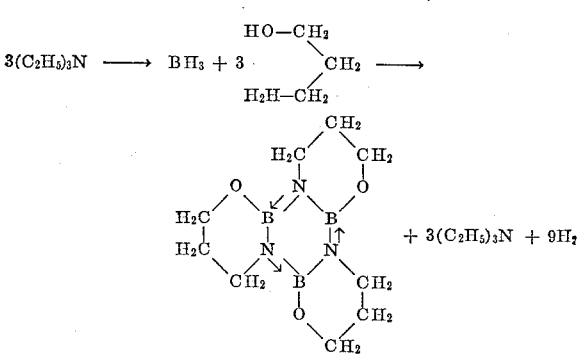

By analogy to the preceding examples, 225 g. (3 mols) of 3-aminopropanol-(1) are added dropwise to a solution of 345 g. (3 mols) of N-triethyl-borazane in 600 ml. of oxylene, heated to about 135° C., whilst stirring, and the reaction mixture is then heated at 140–145° C. for about ½ hour in order to complete the reaction. After the solvent has been distilled off under reduced pressure, the tris-(1,3,2-oxazaborinano)-borazine, identified from its infra-red spectrum is purified by sublimation in vacuum. M.P. 153–157° C. Yield: 86%.

*Analysis.*—Theoretical: B, 13.0%; N, 16.85%; C, 43.3%; H, 7.23%. Found: B, 12.8%; N, 16.58%; C, 42.89%; H, 7.39%.

The mass spectrometrical molecular weight determination of the molecular weight yields a value of 249 mass units.

Example 4

Preparation of tris-(4-methyl-1,3,2-oxazaborinano)-borazine.

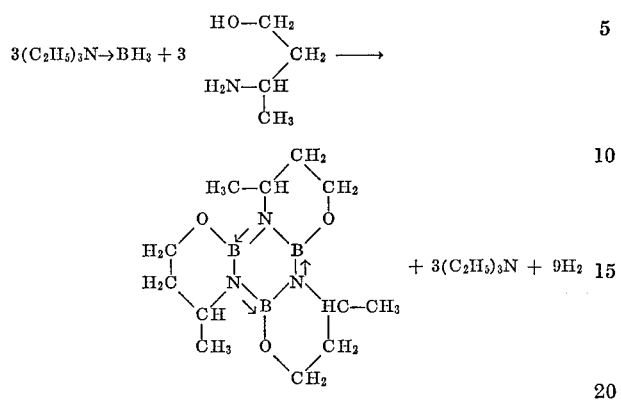

Tris-(4-methyl-1,3,2-oxazaborinano)-borazine, identified from its infra-red spectrum, is obtained from 362 g. (3.15 mols) of N-triethyl-borazane, as its solution in 550 ml. of o-xylene, and 267 g. (3 mols) of 3-aminobutanol-(1) according to the method described in Examples 1 to 3, and can be purified by sublimation in vacuum. Yield 72.1%.

*Analysis.*—Theoretical: B, 11.15%; N, 14.4%. Found: B, 11.1%; N, 14.22%.

The mass spectrometrical molecular weight determination of the molecular weight yields a value of 291 mass units.

Example 5

Preparation of tris-(4,5-benzo-1,3,2-thiazaborolo)-borazine.

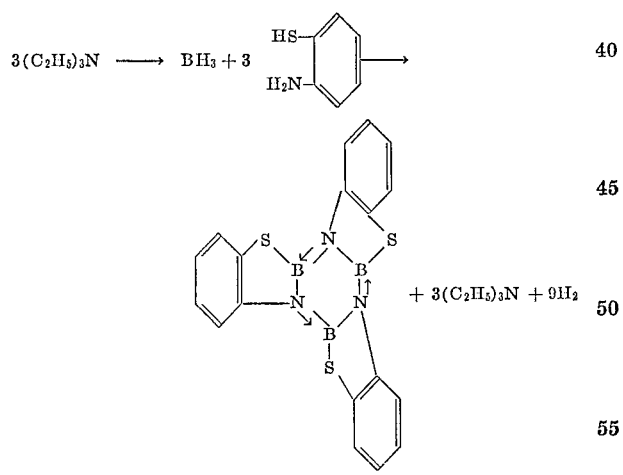

94 g. (0.75 mol) of o-amino-thiophenol are added dropwise during about 60 minutes to a solution of 86.2 g. (0.75 mol) of N-triethyl-borazane at a sump temperature of 100–130° C., and the reaction mixture is then heated to temperatures above about 130–145° C. for about 30 minutes in order to complete the reaction. During this period the triethyl amine formed is distilled off. After removing the solvent in vacuum there are obtained 97 g. of a crude, white, slightly yellow colored asbestoid tris-(4,5-benzo-1,3,2-thiazaborolo)-borazine as residue (M.P. 339–341° C.). After recrystallization from chlorobenzene the purely white borazine which is identified from its infra-red spectrum has a M.P. of 351–353° C. The mass spectrometrical molecular weight determination of the molecular weight yields a value of 399 mass units.

*Analysis.*—Theoretical: S, 24.05%; B, 8.15%; N, 10.55%. Found: S, 24.03%; B, 8.30%; N, 10.71%.

Example 6

Preparation of tris-(4,5-benzo-1,3,2-diazaborolo)-borazine.

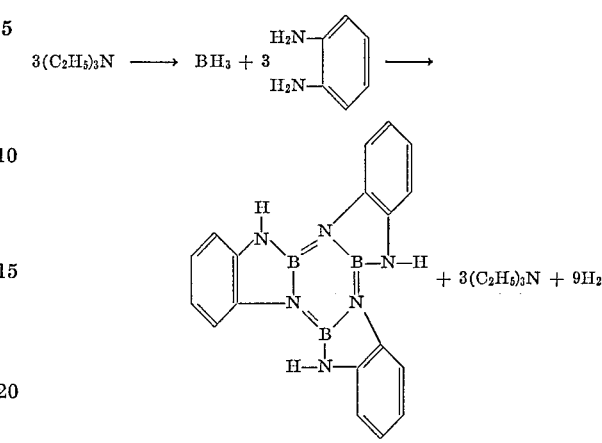

230 g. (2 mols) of N-triethyl-borazane dissolved in 100 ml. of p-cymene (p-methylisopropyl benzene) are added dropwise to a solution of 210 g. (2 mols) of o-phenylenediamine in 500 ml. of p-cymene at a sump temperature of about 130° C. The reaction product is worked up as described in the preceding examples. The resultant crude, slightly light brown colored, asbestoid tris-(4,5-benzo-1,3,2-diazaborolo)-borazine has a M.P. of 320° C. After recrystallizing once from dioxane the then slightly brown colored borazine has a M.P. of 372–373° C. The mass spectrometrical determination of the molecular weight yields a value of 348 mass units. Yield: 217 g. (95.6% of the theoretical).

*Analysis.*—Theoretical: N, 24.14%; B, 9.31%. Found: N, 24.1%; B, 9.32%.

Example 7

Preparation of tris-(4,5-naphtho-[2,2-d]-1,3,2-diazaborolo)-borazine.

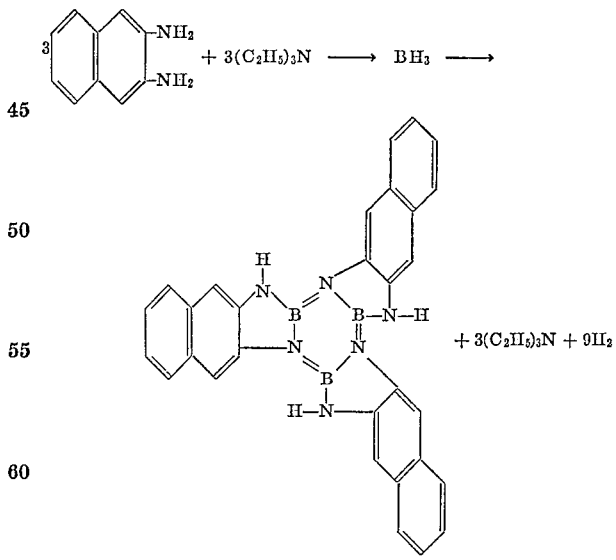

86.2 g. (0.75 mol) of N-triethyl-borazane are added dropwise within about 20 minutes to a suspension of 118.5 g. (0.75 mol) of naphthylene-diamine-(2,3) in 2 litres of p-cymene at a sump temperature of about 110–130° C. and the reaction mixture is subsequently heated to temperatures of about 140–150° C. for about one hour in order to complete the reaction. After cooling, filtering and washing the filtration residue with hexane and drying the residue there are obtained 110 g. (corresponding to a yield of 88.5% of the theoretical) of tris-(4,5-naphtho-[2,3-d]-1,3,2-diazaborolo)-borazine which has a M.P. of 462–465° C. after recrystallizing once from dioxane. The yield of tris-(4,5-naphtho [2,3-d]-1,3,2-diazaborolo)-borazine can be substantially improved by working up the filtrate. The slightly rose-colored borazine which is identified from its infra-red spectrum has a value of 500± mass units (mass spectrometrical determination of the molecular weight).

*Analysis.*—Theoretical: N, 16.8% B, 6.5%. Found: N, 16.1%; B, 6.8%.

Example 8

Preparation of tris - (2,9 1 dioxa - 4 - aza - 8,8,10,10-tetramethyl - 8,10 - disila - 3 - bora-spiro - [5,5]-undecano)-borazine.

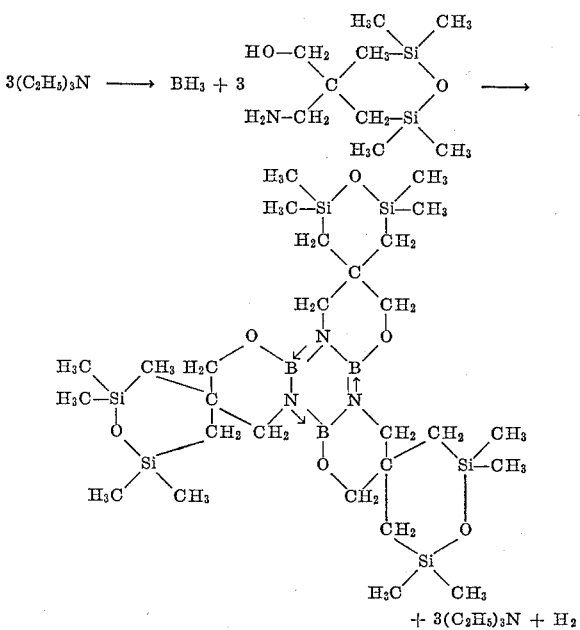

10.4 g. (0.09 mol) of N-triethyl-borazane are added dropwise within about 10 minutes to a solution of 21 g. (0.09 mol) of 4-hydroxymethyl-4-aminomethyl-1-oxa-2,2,6,6-tetramethyl-2,6-disila-cyclohexane in 200 ml. of isopropylbenzene at about 120–140° C. After distilling off the triethylamine the solution is heated to temperatures of 140 to 150° C. for about one hour and the solvent is then distilled off at last in vacuum. The tris-(2,9-dioxa-4 - aza - 8,8,10,10 - tetramethyl - 8,10 - disila - 3 - bora-spiro-[5,5]-undecano)-borazine is obtained in substantially quantitative yield as a wax-like substance of a softening point of about 60° C.

*Analysis.*—Theoretical: B, 4.48%. Found: B, 4.42%, 4.52%.

I claim:
1. Process for the production of cyclic BN-compounds which comprises reacting a borazane of the formula

$$R_3N \rightarrow BH_3$$

wherein $R_3N$ stands for a member selected from the group consisting of tertiary amines and pyridine; such that when $R_3N$ stands for a tertiary amine R is a member selected from the group consisting of alkyl, cycloalkyl, phenyl radicals and halogen-, alkyl-, cycloalkyl- and phenyl-substituted derivatives thereof; with an organic compound selected from the group consisting of o-aminophenols, o-amino-naphthols, o - amino-thiophenols, o- amino-thionaphthols, o-phenylene diamines, o-naphthylene diamines, amino-alcohols, amino-thiols and aliphatic diamines, said amino-alcohols, amino-thiols and aliphatic diamines having 2 to 3 C-atoms in the chain; and halogen-, alkyl-, cycloalkyl-, aryl-, alkyl-silyl-, phenyl-silyl-, alkyl-siloxyl-, and phenyl-siloxyl-substituted derivatives thereof, at a temperature of above 20° C. in a molar ratio of about 1:1.

2. Process for the production of cyclic BN-compounds which comprises reacting a borazane of the formula $$R_3N \rightarrow BH_3$$

wherein $R_3N$ stands for a member selected from the group consisting of tertiary amines and pyridine; such that when $R_3N$ stands for a tertiary amine R is a member selected from the group consisting of alkyl, cycloalkyl, phenyl radicals and halogen-, alkyl-, cycloalkyl- and phenyl-substituted derivatives thereof; with an organic compound selected from the group consisting of o-aminophenols, o-amino-naphthols, o - amino-thiophenols, o - amino-thionaphthols, o-phenylene diamines, o-naphthylene diamines, amino-alcohols, amino-thiols and aliphatic diamines, said amino-alcohols, amino-thiols and aliphatic diamines having 2 to 3 C-atoms in the chain; and halogen-, alkyl-, cycloalkyl-, aryl-, alkyl-silyl-, phenyl-silyl-, alkyl-siloxyl-, and phenyl-siloxyl-substituted derivatives thereof, at a temperature of above 100° C. in a molar ratio of about 1:1.

3. Process for the production of cyclic BN-compounds which comprises reacting a borazane of the formula $$R_3N \rightarrow BH_3$$

wherein $R_3N$ stands for a member selected from the group consisting of tertiary amines and pyridine; such that when $R_3N$ stands for a tertiary amine R is a member selected from the group consisting of alkyl, cycloalkyl, phenyl radicals and halogen-, alkyl-, cycloalkyl- and phenyl-substituted derivatives thereof; with an arganic compound selected from the group consisting of o-aminophenols, o-amino-naphthols, o-amino-thiophenols, o-amino-thionaphthols, o-phenylene diamines, o-naphthylene diamines, amino-alcohols, amino-thiols and aliphatic diamines, said amino-alcohols, amino-thiols and aliphatic diamines having 2 to 3 C-atoms in the chain; and halogen-, alkyl-, cycloalkyl-, aryl-, alkyl-silyl-, phenyl-silyl-, alkyl-siloxyl-, and phenyl-siloxyl-substituted derivatives thereof, at a temperature of 100 to 200° C. in a molar ratio of about 1:1.

4. Process according to claim 3, wherein the reaction is carried out in an inert solvent selected from the group consisting of aromatic hydrocarbons and saturated aliphatic hydrocarbons.

5. Tris-(1,3,2-oxaborinano)-borazine.
6. Tris-(4-methyl-1,3,2-oxazaborinano)-borazine.
7. Tris - (2,9 - dioxa - 4 - aza - 8,8,10,10 - tetramethyl-8,10 - disila - 3 - bora-spiro - [5,5] - undecano-)-borazine.

References Cited
UNITED STATES PATENTS

| | | | |
|---|---|---|---|
| 3,016,402 | 1/1962 | Harris | 260—462 |
| 3,045,038 | 7/1962 | Brotherton et al. | 260—462 |
| 3,047,623 | 7/1962 | Milks | 260—551 |

TOBIAS E. LEVOW, *Primary Examiner.*

J. PODGORSKI, *Assistant Examiner.*

UNITED STATES PATENT OFFICE
CERTIFICATE OF CORRECTION

Patent No. 3,392,181                                    July 9, 1968

Elmar-Manfred Horn

It is certified that error appears in the above identified patent and that said Letters Patent are hereby corrected as shown below:

Column 1, line 17, "phenylsoloxyl" should read -- phenylsiloxyl --. Column 2, lines 8 to 13, the left-hand portion of the formula reading "$R_2N$" should read -- $H_2N$ --; same column 2, lines 60 to 72, the lower right-hand portion of the first complete formula reading "$CH_3$" should read -- $CH_2$ --. Column 6, lines 45 to 59, the lower left-hand portion of the last structural formula reading "$H_2H$" should read -- $H_2N$ --. Column 9, lines 15 to 20, that portion of the formula reading same column 9, lines 21 to 38, that portion of the formula reading

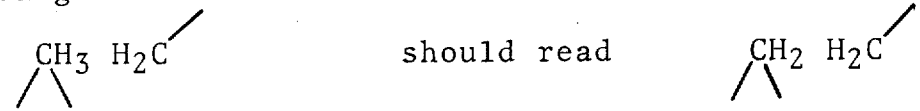

same column 9, line 40, the lower right-hand portion of the formula reading "$+H_2$" should read -- $+9H_2$ --.

Signed and sealed this 23rd day of December 1969.

(SEAL)
Attest:

EDWARD M. FLETCHER, JR.                              WILLIAM E. SCHUYLER, JR.
Attesting Officer                                         Commissioner of Patents